(12) United States Patent
Wane (10) Patent No.: US 8,521,084 B2
(45) Date of Patent: Aug. 27, 2013

(54) METHODS, SYSTEMS AND ARRANGEMENTS FOR WIRELESS COMMUNICATION WITH NEAR-FIELD COMMUNICATION TERMINALS

(75) Inventor: Ismaila Wane, Tucson, AZ (US)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 12/994,007

(22) PCT Filed: May 22, 2009

(86) PCT No.: PCT/IB2009/052145
§ 371 (c)(1),
(2), (4) Date: Mar. 18, 2011

(87) PCT Pub. No.: WO2009/141805
PCT Pub. Date: Nov. 26, 2009

(65) Prior Publication Data
US 2011/0183611 A1     Jul. 28, 2011

Related U.S. Application Data (60) Provisional application No. 61/055,432, filed on May 22, 2008.

(51) Int. Cl.
*H04B 5/00* (2006.01)
*H04B 7/00* (2006.01)

(52) U.S. Cl.
USPC ........... 455/41.1; 455/41.2; 455/41.3; 705/13

(58) Field of Classification Search
USPC .................. 455/41.1, 41.2, 41.3; 705/13
See application file for complete search history.

(56) References Cited

U.S. PATENT DOCUMENTS

| 6,233,683 B1 | 5/2001 | Chan et al. |
| 6,397,242 B1 | 5/2002 | Devine et al. |

(Continued)

FOREIGN PATENT DOCUMENTS

| GB | 2 350 703 A | 12/2000 |
| WO | 00/25278 | 5/2000 |

(Continued)

OTHER PUBLICATIONS

RSA Laboratories; "PKCS #15 V1.0: Cryptographic Token Information Format Standard"; (Apr. 1999).

(Continued)

*Primary Examiner* — Wen Huang (57) ABSTRACT

A variety of near-field devices, methods and systems are implemented in various fashions. One implementation is directed to a mobile station (102) with an over-the-air (OTA) transceiver (104) for communication with a trusted service manager. The mobile station also has a near-field communications transceiver (112) for communication with a terminal reader using file-identifiers of a first size. A memory (106) is used for storing files arranged according to two different sets of files, the first set of files identified by file-identifiers of a first size and the second set of files identified by file-identifiers of a second size that is a different size from the first size. A processor (108) provides access by the OTA transceiver (104) to the stored files. Access by the near-field communications transceiver (112) is provided to the stored files by running either a Java-based emulator for accessing the first set of files or Java APIs to access the second set of files.

20 Claims, 7 Drawing Sheets

(56) References Cited

U.S. PATENT DOCUMENTS

| | | | |
|---|---|---|---|
| 7,058,755 | B2 | 6/2006 | Nallapa |
| 7,232,073 | B1 | 6/2007 | De Jong |
| 7,407,107 | B2* | 8/2008 | Engestrom et al. ...... 235/472.01 |
| 7,967,215 | B2* | 6/2011 | Kumar et al. ................ 235/492 |
| 2006/0074813 | A1 | 4/2006 | Saunders |
| 2008/0116264 | A1* | 5/2008 | Hammad et al. ............. 235/382 |
| 2010/0088430 | A1* | 4/2010 | Ton et al. ...................... 709/248 |

FOREIGN PATENT DOCUMENTS

| | | |
|---|---|---|
| WO | 2004/029860 A | 4/2004 |
| WO | 2008/039796 A2 | 4/2008 |

OTHER PUBLICATIONS

JSR 120 Expert Group; "Wireless Messaging API (WMA) for Java 2 Micro Edition—Version 1.0"; Sun Microsystems Inc.; (2002).

ETSI; "ETSI TS 102 224—Smart Cards; Security Mechanisms for UICC Based Applications—Functional Requirements—Release 6" (Apr. 2002).

ETSI TS 102 240; Smart Cards; UICC Application Programing Interface and Loader Requirements; Service Description—Release 6; (Jul. 2002).

ETSI TS 101 476; Digital Cellular Telecommunications System (Phase 2+); GSM API for SIM Toolkit Stage 2 (3GPP TS 03.19 Version 8.5.0 Release 1999); V8.5.0 (Sep. 2002).

Global Platform; "card Specification Version 2.1.1" (Mar. 2003).

Global Platform; "Globalplatform Key Management System Functional Requiements V. 1.0"; (Nov. 2003).

JSR 177 Expert Group; "Security and Trust Services API (SATSA) for Java 2 Platform, Micro Edition—Version 1.0"; Sun Microsystems, Inc. (2004).

ETSI TS 102 222; "Integrated Circuit Cards (ICC); Administrative Commands for Telecommunications Applications—Release 6"; (Jun. 2004).

Global Platform; "Global Platform Smart Card Management System Functional Requirements—Version 4.0"; (Dec. 2004).

"Integrating the SIM Card Into J2ME as a Security Element—, A Smarter Approach to Secure Java Mobile Applications: JSR177"; A GEMPLUS White Paper 8 Pages (Apr. 2005).

JSR 257 Expert Group; "Contactless Communication API—JSR 257—Version 0.5"; Nokia (Apr. 2005).

ETSI TS 101 181; "Digital Cellular Telecommunications System (Phase 2+); Security Mechanisms for SIM Application Toolkit; Stage 2" (Jun. 2005).

ETSI TS 131 115; Universal Mobile Telecommunications Sytems (UMTS); Secured Packet Structure for (Universal) Subscriber Identity Module (U)SIM Toolkit Appiacations (3GPP TS 31.115 Version 6.5.0 Release 6); (Jun. 2005).

"Mifare Desfire Contactless Multi-Application IC With DES and 3DES Security MF3ICD40—Product Short Form Specification Revision 3.2"; Philips Semiconductors (Dec. 2005).

Sirett, William G., et al; "Design, Installation & Execution of a Security Agent for Mobile Stations"; 16 Pages (2006).

Ananamous; "Release Notes—Java Card Specifications Version 2.2. 2" 8 Pages (Mar. 2006).

APTA;"Contactless Fare Media System Standard—Part II—Contactless Fare Media Data Format and Interface Standard—Version 1.0" (Oct. 2006).

ETSI TS 102 241; "Smart Cards: UICC Application Programming Interface (UICC API) for Java Card—Release 6" (Feb. 2007).

GSM Association; "Mobile NFC Services" Version 1.0 (Feb. 2007).

ETSI TS 101 267; "Digital Cellular Telecommunications System (Phase 2+); Specification of the SIM Application Toolkit (SAT) for the Subscriber Identity Module—Mobile Equipment (SIM-ME) Interface—V8.18.0"; (Jun. 2007).

ETSI TS 131 111; "Digital Cellular Telecommunications Sytems (Phase 2+); Universal Mobile Telecommunications System (UMTS); Universal Subscriber Identity Module (USIM) Application Toolkit—V3.14,0"; (Jun. 2007).

ETSI TS 131 114; "Universal Mobile Telecommunications System (UMTS); LTE; Universal Subscriber Identify Module Application Toolkit (USAT) Interpreter Protocol and Administration (3GPP TS 31.114 Version 8.0,0 Release 80"; V8.0.9 (Mar. 2009).

ETSI TS 102 221; "Smart Cards; UICC-Terminal Interface; Physical and Logical Characteristics—Release 8"; (Jun. 2009).

ETSI TS 102 223; "Smart Cards; Card Application Toolkit (CAT)—Release 9"; (Oct. 2009).

ETSI TS 102 225; "Smart Cards; Secured Packet Structure for UICC Based Applications—Release 7"; (Apr. 2010).

ETSI TS 102 226; "Smart Cards; Remote APDU Structure for UICC Based Applications—Release 9"; (Apr. 2010).

* cited by examiner

METHODS, SYSTEMS AND ARRANGEMENTS FOR WIRELESS COMMUNICATION WITH NEAR-FIELD COMMUNICATION TERMINALS

The present invention relates generally to wireless communications, and more specifically, to mobile stations that interface with near-field communications terminals.

In order to ensure interoperability of transport systems, the American Public Transit Association (APTA) has published the Universal Transit Fare Card Standards (UTFS).

For the applicative data protocol, the UTFS specifications rely on ISO 7816-4 standards. The UTFS and other ISO7816-4 based public transportation specifications are rapidly becoming standardized for mass transit organizations; however, adhering system integrators are still using DESFire plastic cards, which not only meet the ISO 7816-4 specifications but also compete on cost-effectiveness compared to Java cards. DESFire cards are massively deployed in advanced public transportation around the world, and some government infrastructures (e.g., NASA and United States Department of Defense). A DESFire card is a microprocessor-based card, compliant to all 4 levels of ISO/IEC 144443A, running a special purpose operating system (OS), referred as the DESFire OS. As a contactless card relying on NFC technology, a DESFire card can be typically read at a distance of ten centimeters by a Proximity Coupling Device (PCD) or Terminal Reader. It features a memory capacity of four Kilobytes. The DESFire OS features the possibility to have several applications and multiple files.

Mobile Network Operators are also planning to rollout NFC enabled Mobile Stations while delegating the OTA provisioning of virtual cards into UICCs, emulating plastic cards. In the near future, NFC-value added services are going to be deployed over Global System for Mobile (GSM) (2.5G), Universal Mobile Telecommunications System (UMTS) (3G) and other next-generation networks in NFC-enabled Mobile Stations. A typical Mobile Station shall be composed of a UMTS Integrated Circuit Chip (UICC) and a NFC chip-enabled handset leveraging both on Java technology. Along with storing user subscriber information, the UICC can contain banking, event ticketing, transit, loyalty and other applications provisioned over-the-air (OTA).

The GSM Association (GSMA) refers entities having this important OTA provisioning role in the mobile NFC ecosystem as Trusted Service Managers. These Trusted Service Managers shall mainly rely on 3GPP, ETSI-SCP and Global Platform technical specifications for the OTA provisioning mechanisms. Applications based on proprietary technologies such as Mifare Classic and DESFire require other provisioning mechanisms not addressed by the current technical specifications.

A variety of near-field communication related devices, methods and systems are implemented in various fashions.

One embodiment of the present invention includes a mobile station with an over-the-air (OTA) transceiver for wireless communication with a trusted service manager. The mobile station also has a near-field communications transceiver for communication with a terminal reader that uses a data exchange protocol that includes file-identifiers of a first size. A memory is used for storing files arranged according to two different sets of files, the first set of files identified by file-identifiers of a first size and the second set of files identified by file-identifiers of a second size that is a different size from the first size. A processor is used for providing access by the OTA transceiver to the stored files, and providing access by the near-field communications transceiver to the stored files by running, as a default, a Java-based emulator for accessing the first set of files, and otherwise running one or more Java application-programming interfaces (APIs) to access the second set of files.

Another embodiment of the present invention relates to a method for use with a mobile station having an over-the-air (OTA) transceiver for wireless communication with a trusted service manager, a near-field communications transceiver for communication with a terminal reader that uses a data exchange protocol that includes file-identifiers of a first size, a memory for storing files and a processor. Files stored in the memory are arranged according to two different sets of files, the first set of files identified by file-identifiers of a first size and the second set of files identified by file-identifiers of a second size. The processor is used to provide access by the OTA transceiver to the stored files, and provide access by the near-field communications transceiver to the stored files by running, as a default, a Java-based emulator for accessing the first set of files, and otherwise running one or more Java APIs to access the second set of files.

Another embodiment of the present invention relates to a system having a trusted service manager, a terminal reader, and a mobile station. The mobile station has an over-the-air (OTA) transceiver for wireless communication with the trusted service manager. The mobile station also has a near-field communications transceiver for communication with a terminal reader that uses a data exchange protocol that includes file-identifiers of a first size. A memory stores files arranged according to two different sets of files, the first set of files identified by file-identifiers of a first size and the second set of files identified by file-identifiers of a second size. A processor is used for providing access by the OTA transceiver to the stored files, and providing access by the near-field communications transceiver to the stored files by running, as a default, a Java-based emulator for accessing the first set of files, and otherwise running one or more Java APIs to access the second set of files.

The above summary is not intended to describe each embodiment or every implementation of the present disclosure. The figures and detailed description that follow more particularly exemplify various embodiments.

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

The present invention is believed to be applicable to a variety of different types of processes, devices and arrangements for use with wireless communications, and in particular, to approaches for use with mobile stations that communicate using near-field communications and/or over-the-air communications. While the present invention is not necessarily so limited, various aspects of the invention may be appreciated through a discussion of examples using this context.

Consistent with an example embodiment of the present invention, a mobile station is implemented. The mobile station includes a cellular transceiver for wireless communication with a trusted service manager. A near-field communications (NFC) transceiver communicates with a terminal reader using a data exchange protocol (e.g., DESfire) that includes file-identifiers of a first size. A memory stores files arranged according to two different sets of files, the first set of files (e.g., DESfire) identified by file-identifiers of a first size and the second set of files identified by file-identifiers of a second size (e.g., formatted according to Java, Global System for Mobile (GSM) (2.5G) or Universal Mobile Telecommunications System (UMTS) (3G)). A processor provides access, by the cellular transceiver, to the stored files. The processor also provides access, by the NFC transceiver, to the stored files. The processor runs, as a default, a Java-based emulator for accessing the first set of files. If a selection of a specific file is otherwise provided, the processor implements the selected file, which may include one or more Java APIs associated with the second set of files.

Aspects of the invention can be useful for a mobile station that interfaces with systems using otherwise incompatible communication protocol. In particular, the systems may use file systems that have different file-identification protocols. Software configured for one of the file-identification protocols would not properly handle data requests formatted according to a different file-identification protocol. The mobile station includes emulation software that emulates one of the file-identification protocols. This can be particularly useful for use with external sources (e.g., terminal readers) that are only configured to use the emulated file-identification protocols.

Aspects of the invention can be useful for allowing a Trusted Service Manager to configure the mobile station. Configuration can include, for example, initialization of the mobile device. Various files can be created or modified during initialization, such as personalized data for a particular mobile station user or security information for verifying future transactions. Configuration can also include subsequent modification of stored files including, but not limited to, updates to security information or to software applications.

In a specific embodiment of the present invention, the mobile station includes a handset that allows for both over-the-air (OTA) communications and near-field communications. As used herein OTA denotes communications capable of transmitting at distances exceeding a meter, whereas, near-field communications (NFC) only operate a distances less than about a meter. A specific type of OTA communications are cellular-based communications, such as GSM (2.5G) or UMTS (3G).

One embodiment of the present invention relates to a specific type of NFC chip (e.g., a smartcard) that complies with ISO 14443A and also with ISO 14443-4. A particular example provides Data Encryption Standard/Triple Data Encryption Standard (DES/3DES) encryption of stored and transmitted data. A NFC IC chip using the Mifare-DESFire protocol is a specific example of such an embodiment. While the invention is not so limited, the following discussion is directed toward such a specific embodiment.

Stored files in such a Mifare Objects include legacy Mifare applications. The objects are essentially grouped into two types:

Classic Mifare Objects: Mifare Classic 1 k and 4 k applications; and

DESFire Mifare Objects: DESFire applications herein referred to as DESFire Applets.

Figure 1A:
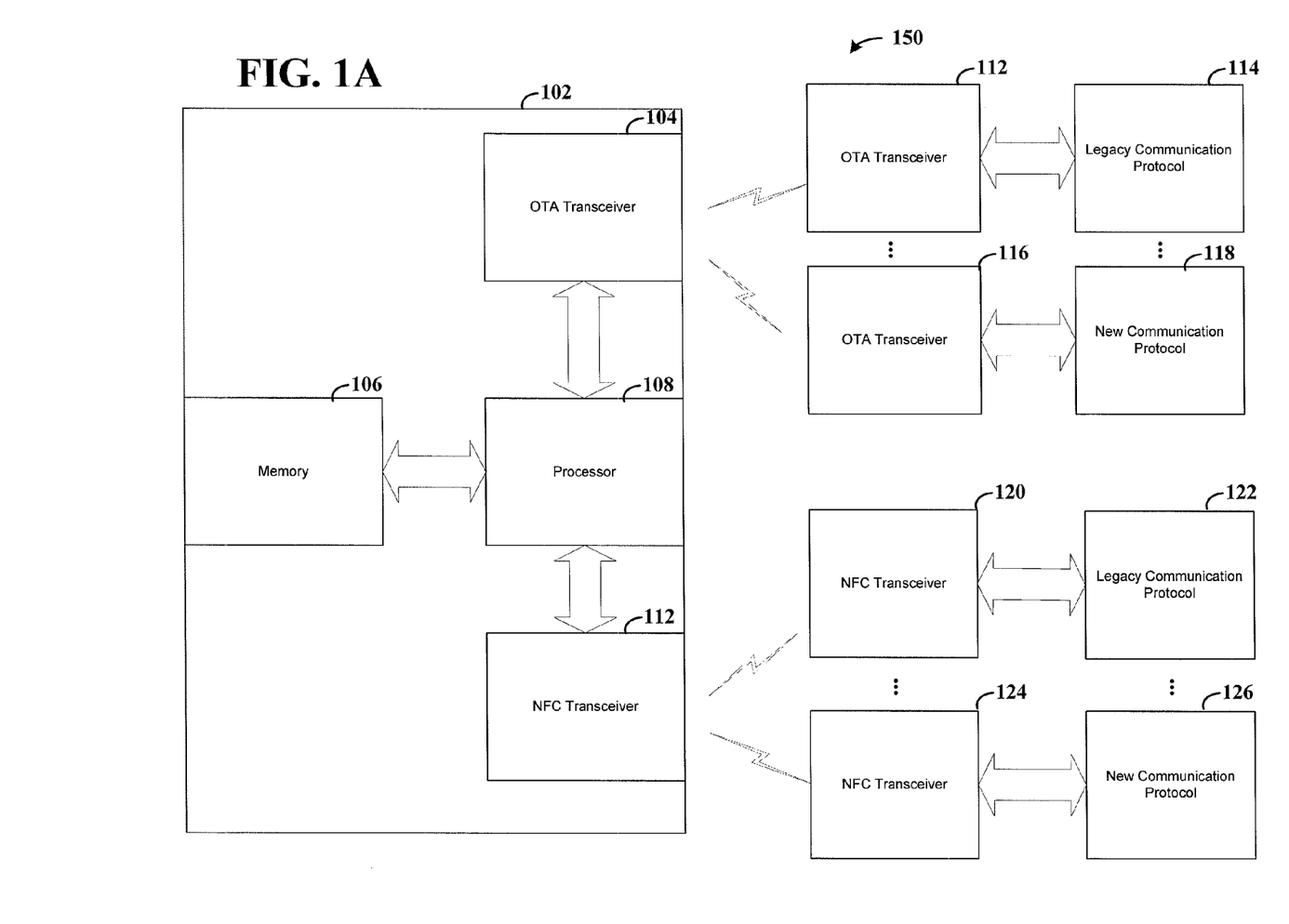
FIG. 1A is a system that includes a mobile station that communicates using either legacy protocols or new protocols, according to an example embodiment of the present invention.

FIG. 1A is a system that includes a mobile station that communicates using either legacy protocols or new protocols, according to an example embodiment of the present invention. Mobile Station 102 communicates with remote Station(s) 150 using one of two different transceivers. The first transceiver 104 is an OTA transceiver, whereas the second transceiver 112 is an NFC transceiver. Processor 108 provides access to memory 106 to Mobile Stations 102. Remote stations 150 can include a number of different transceivers (112, 116, 120 and 124). These transceivers can be either OTA-based or NFC-based. The transceivers can be operated using either legacy protocols (114, 122) or new protocols (118, 126).

Memory 106 contains software code that, when executed on processor 108, provides an interface to transceivers operating according to either protocol. In a specific instance, the new protocol is a Java protocol operating using various Java files/applets. In a specific instance, the legacy protocol is a non-Java protocol. For Remote Stations 150 that operate using the new protocol, access requests to the Java files/applets are accomplished using file identifiers that have a first format. For Remote Stations 150 that operate using the legacy protocol, access requests to legacy files are accomplished using a second format. The second format includes a file/application identifier that is not supported within the new format. Moreover, an implementation that used conventional mechanisms to decode the legacy format would either detect an improper request or erroneously decode the request. Accordingly, the processor 108 uses the second format as the default format. If processor 108 determines that the access request is consistent with the first format, processor 108 uses the conventional mechanisms.

In one embodiment, the processor 108 is further configured to use conventional Java applets (associated with the new protocol) to perform one or more functions associated with the legacy protocol. For example, one or more cryptography functions may be common (or similar) to both protocols.

In a specific embodiment, transceiver 112 is implemented using a NFC transceiver that is powered via a radio-frequency (RF) signal received from one of the remote stations. In one instance, transceiver 104 is implemented using a cellular transceiver. The mobile station 102 can include various functionality associated with the cellular transceiver including, but not limited to, mobile phone, personal digital assistant, mobile television and Internet access.

Figure 1B:
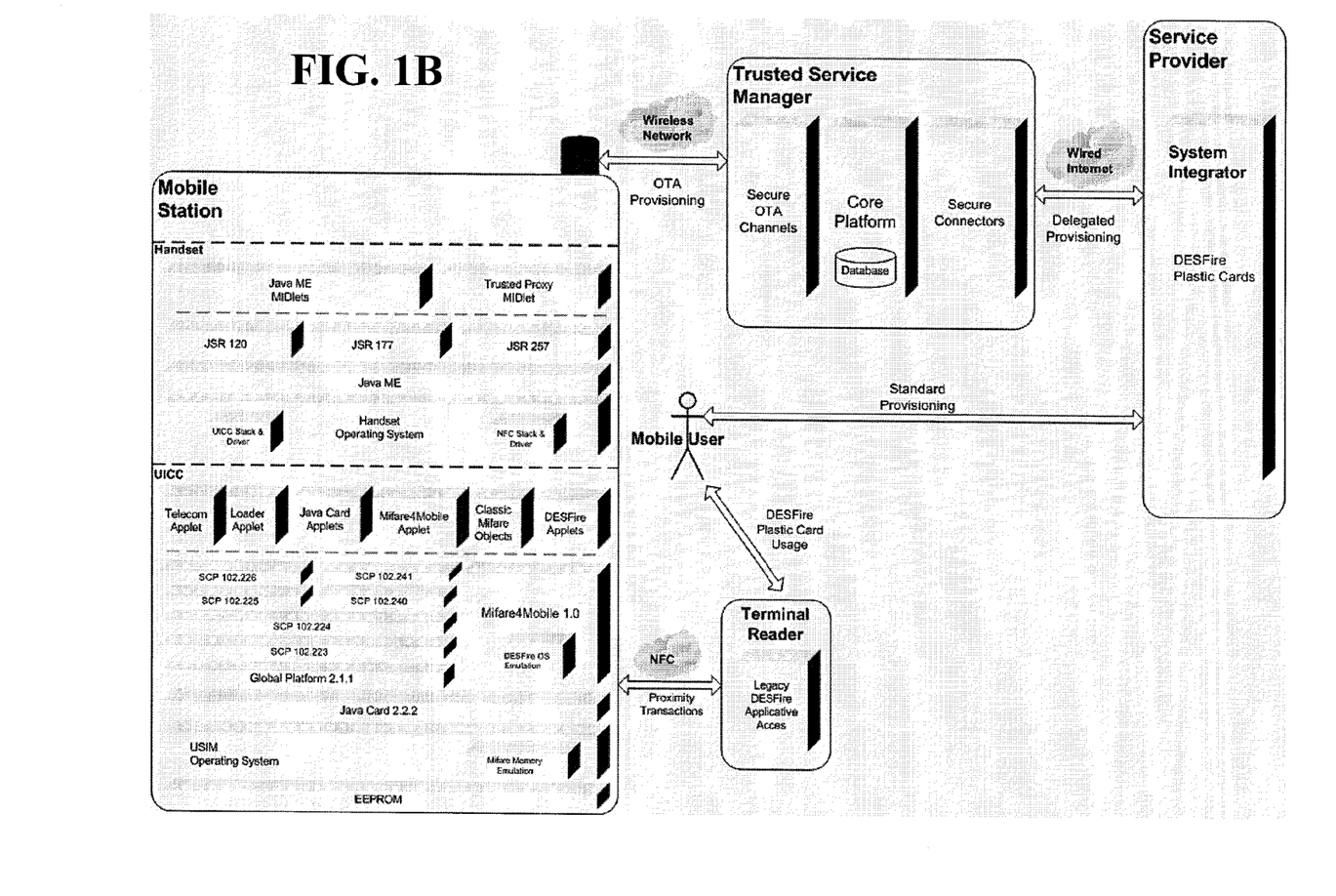
FIG. 1B shows a Mobile Station deployed by a Mobile Network Operator for NFC-value added services provisioning via a Trusted Service Manager, according to an example embodiment of the present invention.

FIG. 1B shows a Mobile Station deployed by a Mobile Network Operator for NFC-value added services provisioning via a Trusted Service Manager, according to an example embodiment of the present invention. This system can be implemented without infrastructure changes for the Service Provider and its System Integrator, by leveraging from legacy DESFire-based Terminal Readers. Physically, the Mobile Station is composed of an NFC chip-enabled handset with a UICC. In a specific implementation, the Mobile Station is a cellular device, such as a handheld phone or similar communication device.

In a particular embodiment, the Mobile Station provides full compliance to all levels of ISO 14443A by operating in a card emulation mode. The Mobile Station can also be compliant with the ISO 14443-4 Protocol and Parameter Selection (PPS) feature of a DESFire card, which allows a non-symmetrical information interchange baud rate.

The Mobile Station hosts two applications responsible for the provisioning mechanisms of Mifare applications. These applications are the Trusted Proxy MIDlet and the Mifare4Mobile Applet.

The Trusted Proxy MIDlet is located in the Java handset stack, which features Java Specific Requests (JSR) 120, 177 and 257. The Trusted Proxy MIDlet is triggered by a short message service (SMS)-PUSH from the Trusted Service Manager consistent with JSR 120. The Trusted Proxy MIDlet uses JSR 177 to forward the Trusted Service Manager's Application Protocol Data Units (APDUs) to the Mifare4Mobile Applet. The Trusted Proxy MIDlet also uses the NFC push mechanism from JSR 257 for generating an alert indicating that an unauthorized reader attempted to communicate with the DESFire emulated card.

The Mifare4Mobile Applet is a Card Application Toolkit Applet that can securely communicate over a wireless network with a trusted backend provisioning system via ENVELOPE APDUs. As defined by ISO 7816-4, an ENVELOPE APDU is used to transmit APDUs or part of APDUs or other data strings that otherwise could not be transmitted by the available protocols. This transmission protocol is reinforced by the JSR 177, which mandates that all APDUs coming to the UMTS Integrated Circuit Chip (UICC) via the network need to be in ENVELOPE format.

As a Java Card application, the Mifare4Mobile Applet can install and delete classic Mifare Objects. The Mifare4Mobile Applet is provisioned into the UICC using ETSI and Global Platform card specifications. It has the 'Default Selected' application privilege when the UICC is emulating an ISO14443 card. This privilege allows it to handle any APDU commands during a proximity transaction except the ISO 7816-4 defined SELECT and MANAGE_CHANNEL commands, which are handled by the Java Card Runtime Environment (JCRE).

The ISO 7816-5 specifications define Application Identifiers (AIDs) as parameters for an application selection command via the ISO 7816-4 SELECT command. An AID consists of the concatenation of an RID (Registered Application Provider Identifier) and a PIX (Proprietary Application Identifier Extension). The RID has a length of five bytes, whereas the PIX has a variable length of between zero and eleven bytes. Thus, the length of an ISO 7816-5 compliant AID varies between five to sixteen bytes. RIDs can be registered through the ISO standardization group.

The Mifare4Mobile Applet uses the ISO7816-5 registered DESFire AID which has the following hexadecimal string value: "D2 76 00 00 85 01 00".

As the Trusted Service Manager's on-card component, the Mifare4Mobile Applet is able to interface with the DESFire OS emulation and to provision DESFire Applets.

The Trusted Service Manager's backend system is composed of Secure OTA Channels, Secure Connectors and a Core Platform. The OTA Channels are used for secure sessions with Mobile Stations over the Mobile Network Operator's wireless network. The Connectors are used for secure web-based sessions with Service Providers. The Core Platform represents the central component of the Trusted Service Manager's backend system. This backend system embeds a secure and fast-queriable database to store provisioning-related information. Besides scalability and robustness, the backend system can include logic for communicating with Mobile Stations that host the Trusted Proxy and Mifare4Mobile Applet.

Figure 2:
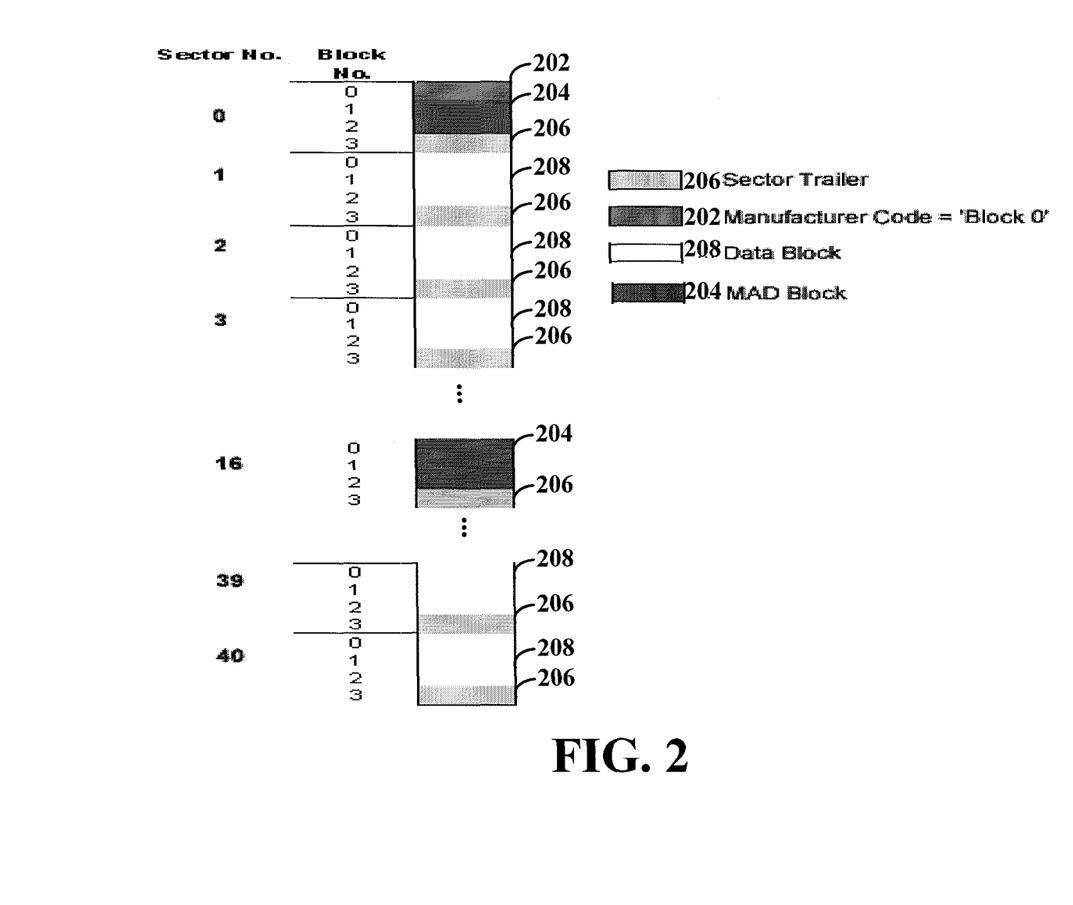
FIG. 2 shows memory organization for the Mifare memory emulation, according to an example embodiment of the present invention.

FIG. 2 shows memory organization for the Mifare memory emulation, according to an example embodiment of the present invention. The memory organization includes four Kilobytes (KB) of EEPROM with 3480 bytes freely available. Forty securely separated sectors support multi-application. Thirty-two sectors are implemented as four blocks with a length of sixteen bytes. Eight sectors are implemented as sixteen blocks with a length of sixteen bytes 2×48 bit keys per sector for key hierarchy. Access conditions are configurable based on two-level key hierarchy.

To comply with the Mifare4Mobile solution, the DESFire read-only seven-byte UID is required to be set into the UICC's Mifare memory emulation before deployment.

A DESFire Applet uses for its applicative data structure, the ISO 7816-4 defined Application Protocol Data Unit (APDU) protocol. These APDU-structured commands are referred to as DESFire commands. In terms of security, all data are protected using cryptographic algorithms, such as DES, 3DES or Advanced Encryption Standard (AES). However, a standard DESFire OS does not integrate with standard Java Card technology. Specifically, DESFire Applets are not Java Card Applets. Consequently, legacy DESFire Applets running on DESFire cards cannot be provisioned into Java cards using ETSI-SCP specifications.

The DESFire OS emulation has the following features
28 DESFire Applets
32 ISO7816-4 compliant files per DESFire Applet
35 ISO7816-4 structured DESFire commands
Cryptographic services
Mifare-Standardized application identifiers for DESFire Applets
Automatic maintenance of the Mifare Application Directory (MAD)

The DESFire OS has an ISO 7816-4 compliant organization for its file system.

As Java Card technology does not provide APIs for ISO 7816-4 file system, the Mifare4Mobile Applet relies on its Toolkit functionality to read and write in the GSM file system. Thus, the Mifare4Mobile Apple can interface with the entire DESFire file system emulation, which has a capacity of 896 files, and 28 directories where a directory represents a DESFire Applet. The emulation takes into account that a DESFire file is addressable by one-byte identifier whereas a GSM file is addressable by a two-byte identifier. The security feature of the GSM file system via access conditions combining Personal Identity Numbers (PINs) and Personal Unblocking Keys (PUKs) is also leveraged by associating each DF containing a DESFire Applet with a Card Holder Verification (CHV) corresponding to the application key.

The DESFire emulation has two categories of files:
Dedicated File (DF)
Elementary File (EF)

The root of the DESFire file system is in a DF relative to the MF of the GSM file system, which has the '3F00' reserved value. Thus, the DF containing the DESFire file system is referred to as DFMifare4Mobile with the value XXXX. If desired, this value can be reserved by the appropriate standard body.

A DESFire Applet has five types of files divided into three groups:
Transparent
  StdDataFile
  BackupDataFile
  ValueFile
Linear
  LinearRecordFile
Cyclic
  CyclicRecordFile The DFMifare4Mobile can contain at least 28 DFs where each DF is a DESFire Applet, containing up to 32 DESFire Applet files.

Figure 3:
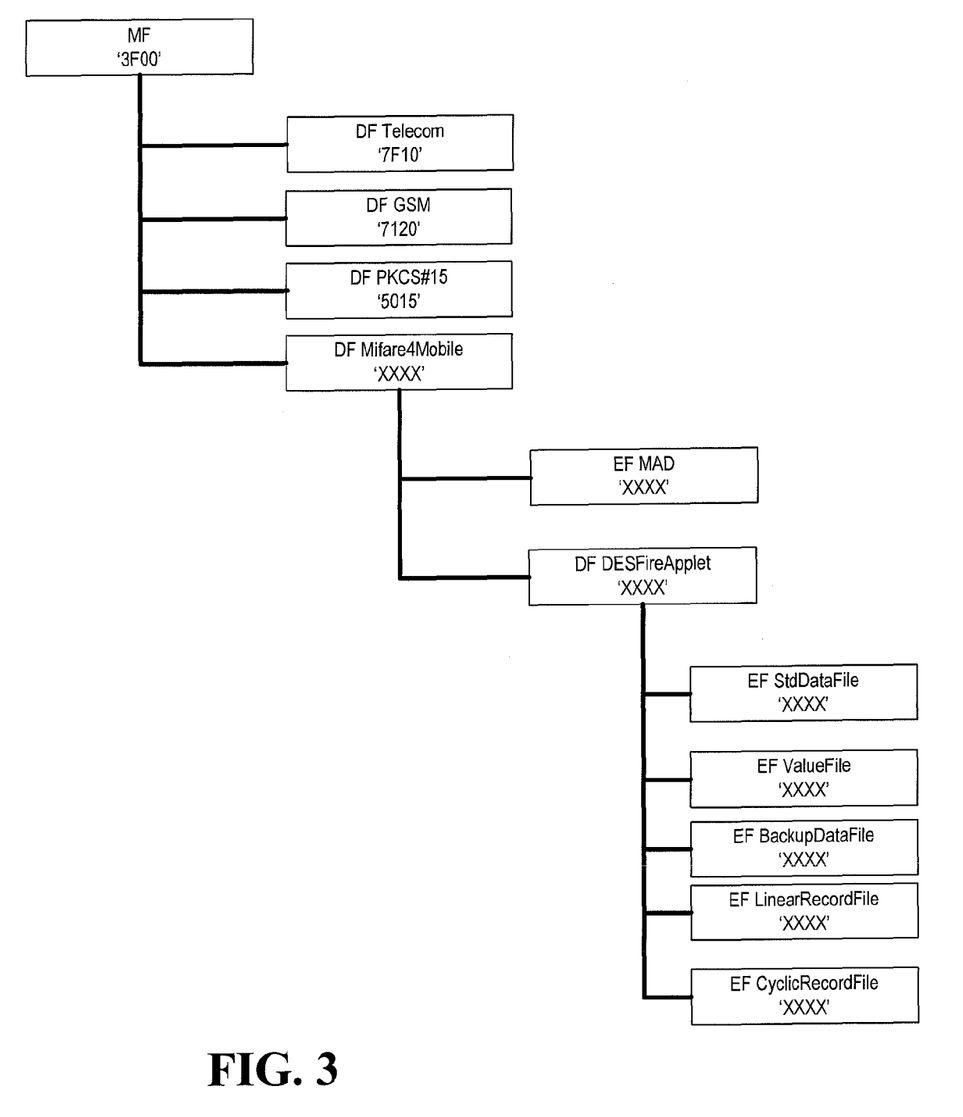
FIG. 3 shows an example file system consistent with an embodiment of the present invention.

FIG. 3 shows an example file system consistent with an embodiment of the present invention. The file system includes both a GSM file system and a DESFire file system. The DESFire file system contains a DESFire Applet with five different files.

All commands and data frames exchanged between the Mobile Station and the Terminal Reader are using block format as defined in ISO 14443-4.

The Mifare4Mobile Applet implements all 35 DESFire commands (listed hereafter), which are based on ISO 71816-4 APDU structure.

Nine Proximity Integrated Circuit Chip (PICC) Level Commands:
  Create Application
  Delete Application
  Get Application IDs
  Free Memory
  GetDFNames
  Select Application
  Format PICC
  Get Version
  GetCardUID
  Six Security Level Commands:
  Authenticate
  Change KeySettings
  Set Configuration
  Get KeySettings
  Change Key
  Get KeyVersion
  Nine Application Level Commands:
  Get FileIDs
  Get FileSettings
  Change FileSettings
  Create StdDataFile
  Create BackupDataFile
  Create ValueFile
  Create LinearRecordFile
  Create CyclicRecordFile
  Delete File
  Eleven Data Manipulation Commands:
  Read Data
  Write Data
  Get Value
  Credit
  Debit
  Limited Credit
  Write Record
  Read Records
  Clear RecordFile
  Commit Transaction
  Abort Transaction The Mifare4Mobile Applet uses the Java Card cryptographic APIs to emulate the security features of a DESFire card prior to data transmission. Encryption algorithms include DES, 3DES and AES. Cryptographic checksum can also be supported.

Each application can include a key file. The four different file access rights featured in a DESFire card are also supported. These access rights are:
  Read Access
  Write Access
  Read & Write Access
  Change Access Rights A one-byte access right key is associated to each file. The value 0xE refers to 'Free' access while 0xF refers to 'Never' access conditions. Access to user data is granted on the application level. For each application, a maximum of fourteen user definable keys can be assigned to control access to data stored in the DESFire emulation.

Terminal Readers access DESFire cards via all four levels of ISO 14 4443 and optional ISO 7816-4 commands (APDUs).

The DESFire OS uses a proprietary AID standard based on Mifare standards, which assign a three-byte AID for a DESFire Applet. The Mifare Standardization group mandates the following AID format convention for DESFire Applets:

| DESFire AID Byte 0 | | DESFire AID Byte 1 | | DESFire AID Byte 2 | |
|---|---|---|---|---|---|
| Nibble 0 | Nibble 1 | Nibble 2 | Nibble 3 | Nibble 4 | Nibble 5 |
| 0xF | | Mifare Classic AID | | | 0x0 ... 0xF |

The three-byte DESFire AID encapsulates the Mifare Classic AID.

The first nibble of the DESFire AID is fixed to 0xF to indicate Mifare classic AID is used. The next four nibbles hold the Mifare Classic AID. The last nibble ranges from zero to sixteen to support multiple DESFire AIDs within the context of one Mifare classic AID. The DESFire Applet AID 0xFFFFFF is reserved as it is used to store general issuer information.

In ISO 14443A card emulation mode, an NFC enabled Mobile Station would not understand the data exchange protocol initiated by the NFC terminal reader (PCD) if no SELECT [AID] command conforming to both ISO 7816-4 and ISO 7816-5 is issued. To remedy to this problem, the emulating Mobile Station is required to set the Mifare4Mobile Applet as the default selected Applet, which acting as a proxy, forwards the APDUs of the NFC Terminal to the DESFire Applet. This implicit selection mechanism allows the Mobile Station to emulate a DESFire card via the Mifare4Mobile Applet. Accordingly, when a SELECT command is used, the selected application will be use and when no SELECT command is used the Mifare4Mobile Applet is used.

Figure 4:
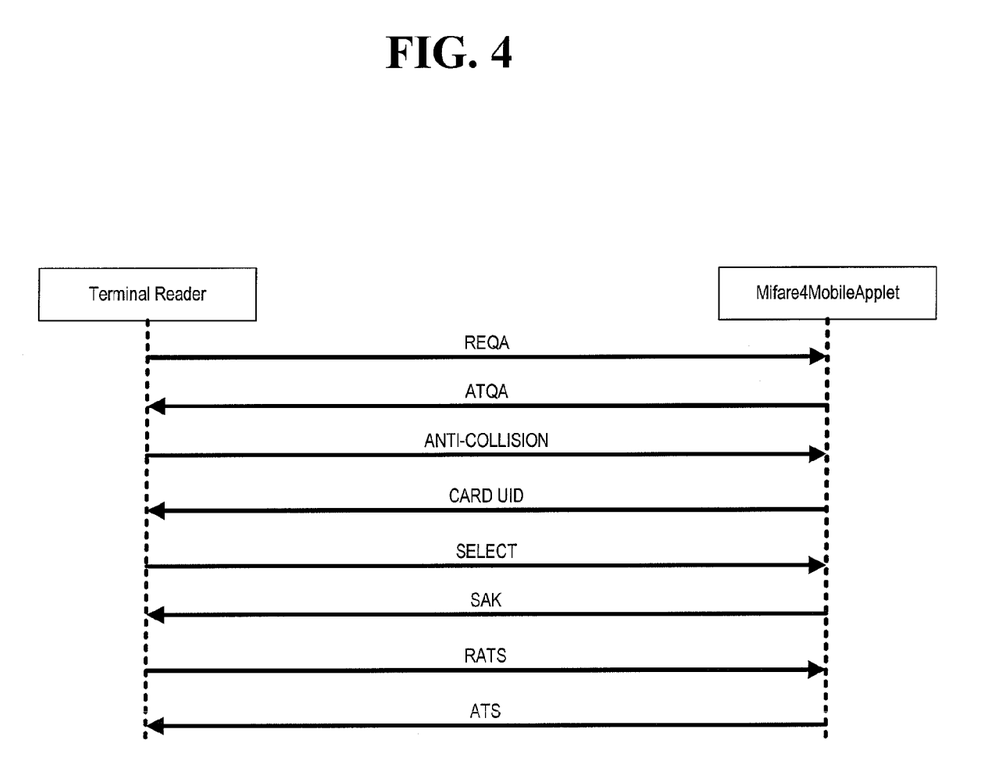
FIG. 4 shows communications between the Service Provider's NFC Terminal and a Mobile Station emulating an ISO 14443A card, according to an example embodiment of the present invention.

FIG. 4 shows communications between the Service Provider's NFC Terminal and a Mobile Station emulating an ISO 14443A card, according to an example embodiment of the present invention. The NFC terminal, which always initiates dialog, probes the RF field for type A cards with the Request A (REQA) command. All cards in the field respond to that command with the Answer to REQA (ATQA). The anti-collision mechanism allows the selection of the Mobile Station. The exchanges described in FIG. 4 represent communications between the Service Provider's NFC Terminal and a Mobile Station emulating an ISO 14443A card. In a specific instance, these communications conform to all four levels of the ISO 14443A standard.

Figure 5:
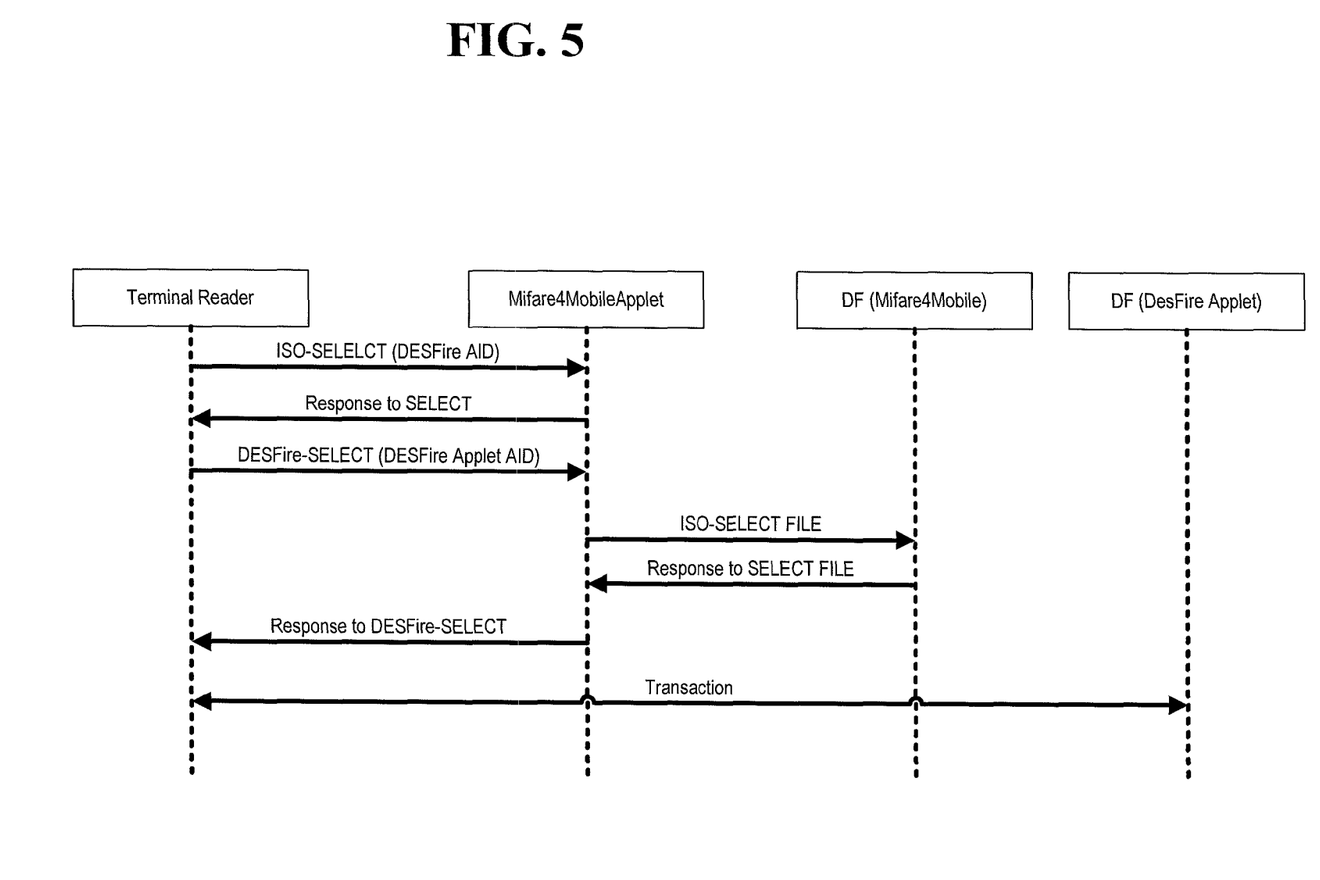
FIG. 5 shows applicative dialogs between a Terminal Reader and the UICC hosting both the Mifare4Mobile Applet and the DESFire Applet, according to an example embodiment of the present invention.

FIG. 5 shows applicative dialogs between a Terminal Reader and the UICC hosting both the Mifare4Mobile Applet and the DESFire Applet, according to an example embodiment of the present invention. The applicative data transmission protocol is compliant to ISO 7816-4 standard. DESFire APDU commands are used. The exchanges shown in FIG. 5 describe applicative dialogs between a Terminal Reader and the UICC hosting both the Mifare4Mobile Applet and the DESFire Applet. Within the Terminal Reader RF field, the Mobile Station, implicitly the UICC, is emulating an ISO 14443A card. Thus, the JCRE shall receive most APDUs (except, for example, ENVELOPE APDUs).

Service Providers provision actual DESFire Applets into plastic DESFire cards by programming them. This pre-issuance method consists of using DESFire command sets while leveraging on ETSI-SCP. Initialization data is loaded into access right pre-configured files.

Figure 6:
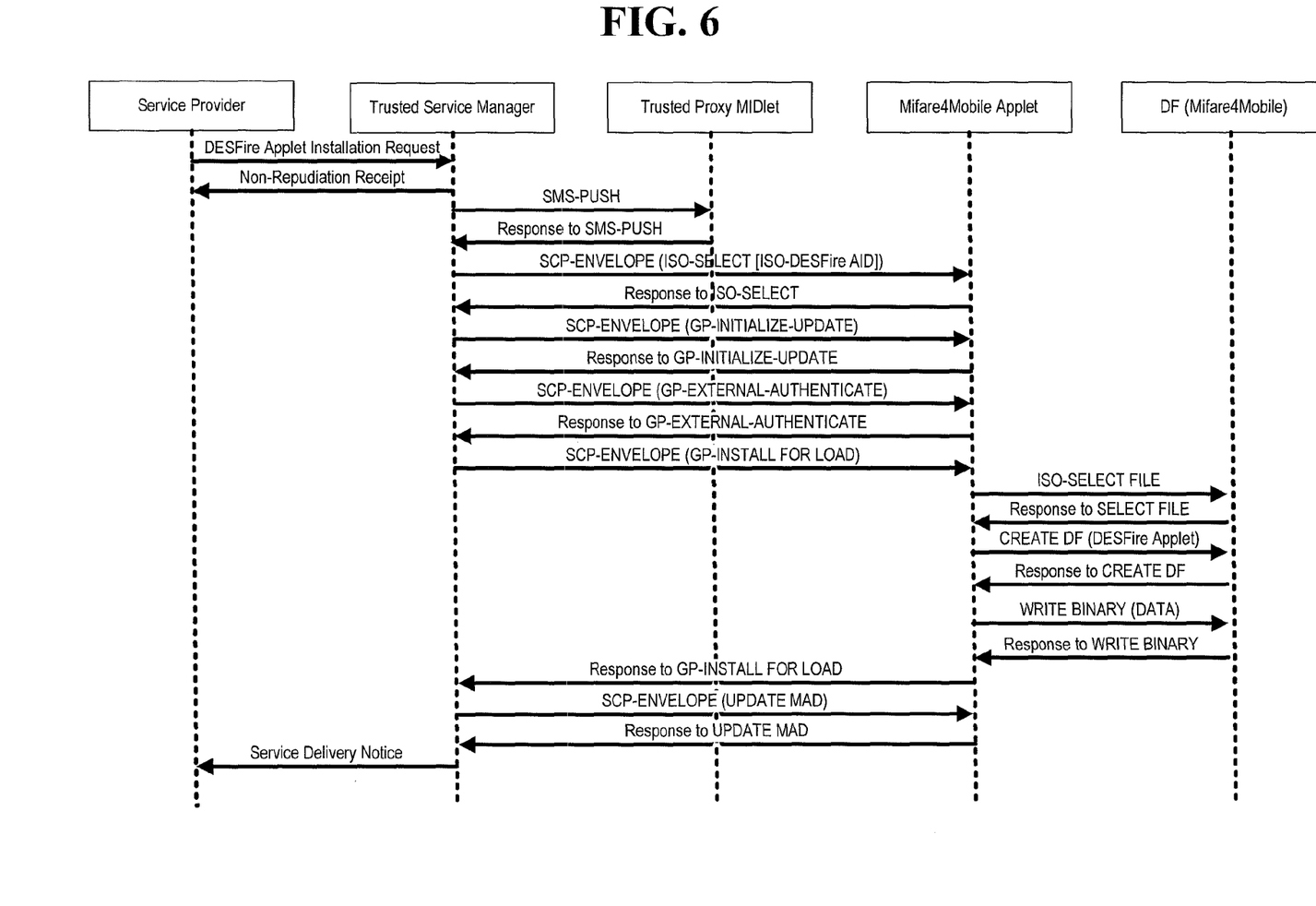
FIG. 6 shows that the Trusted Service Manager needs to be granted 'create file' rights into the UICC by the Mobile Network Operator, according to an example embodiment of the present invention.

FIG. 6 shows that the Trusted Service Manager needs to be granted 'create file' rights into the UICC by the Mobile Network Operator, according to an example embodiment of the present invention. This is for the purposes of recreating the DESFire Applet into the GSM file system. The Service Provider provides to the Trusted Service Manager the required parameters including the application specific key for recreating the DESFire Applet. Afterwards, the Trusted Service Manager forwards the data to the Mifare4Mobile Applet. Similar to an optional delegated management mechanism described in Global Platform card specifications 2.1.1, the Trusted Service Manager provides a secure channel to the Service Provider to install a DESFire Applet without divulging its service Master Key. For that matter the Mifare4Mobile Applet uses a PICC level Change Key DESFire command, which allows for subsequent modification of the DESFire card Master Key used to release memory. The Mifare4Mobile Applet executes this command in response to authentication of the host party (e.g., a Trusted Proxy of the Trusted Service Manager).

While the present invention has been described above and in the claims that follow, those skilled in the art will recognize that many changes may be made thereto without departing from the spirit and scope of the present invention.

What is claimed is:

1. A mobile station configured for interfacing with systems using file systems having different file-identification protocols comprising:
   - an over-the-air transceiver for wireless communication with a trusted service manager;
   - a near-field communications transceiver for communication with a terminal reader that uses a data exchange protocol that includes file-identifiers of a first size;
   - a memory for storing files arranged according to two different sets of files wherein the first set of files is identified by file-identifiers of the first size and the second set of file is identified by file-identifiers of a second size that is a different size from the first size; and
   - a processor configured to
      - provide access via the OTA transceiver to the stored files, and
      - provide access via the near-field communications transceiver to the stored files by
         - when no selection command is provided, accessing the first set of files using a Java-based emulator emulating one of the file identification protocols, and
         - when a selection command is provided, accessing the second set of files using one or more Java application-programming interfaces.

2. The mobile station of claim 1, wherein the processor provide cryptographic functions using one of the Java APIs.

3. The mobile station of claim 1, wherein the Java based emulator is configured to access 28 dedicated files each having 32 elementary files.

4. The mobile station of claim 3, wherein the processor uses one of personal identification numbers, personal unblocking keys and application keys for controlling access to each file.

5. The mobile station of claim 3, wherein the processor is configured to allow configuration of the DESfire files via the OTA transceiver and wherein the OTA transceiver is a cellular transceiver.

6. The mobile station of claim 3, wherein one or more of the files contain transaction data for a user of the mobile station.

7. A method for use with a mobile station configured for interfacing with systems using file systems having different file-identification protocols and having an over-the-air transceiver for wireless communication with a trusted service manager, a near-field communications transceiver for communication with a terminal reader that uses a data exchange protocol that includes file-identifiers of a first size, a memory for storing files and a processor, the method comprising:
   - arranging files stored in the memory according to two different sets of files wherein the first set of files is identified by file-identifiers of the first size and the second set of files is identified by file-identifiers of a second size that is a different size from the first size; and
   - using the processor to
      - provide access by the OTA transceiver to the stored files, and
      - provide access by the near-field communications transceiver to the stored files by
         - running, as a default, a Java-based emulator emulating one of the file emulation protocols for accessing the first set of files, and
         - otherwise accessing the second set of files using one or more Java application programming interfaces.

8. The method of claim 7, further including the step of providing cryptographic functions using one or more Java APIs.

9. The method of claim 7 wherein the Java based emulator is configured to access 28 dedicated files each having 32 elementary files.

10. The method of claim 9, further including the step of controlling access to the files using one of a personal identification number, a personal unblocking key and an application key.

11. The method of claim 9, further including the step of configuring the DESfire files via the OTA transceiver and wherein the OTA transceiver is a cellular transceiver.

12. The method of claim 9, wherein one or more of the files contain transaction data for a user of the mobile station.

13. A system comprising:
   - a trusted service manager;
   - a terminal reader; and
   - a mobile station configured for interfacing with the system using file systems having different file-identification protocols and comprising
      - an over-the-air transceiver for wireless communication with the trusted service manager;
      - a near-field communications transceiver for communication with a terminal reader that uses a data exchange protocol that includes file-identifiers of a first size;

a memory for storing files arranged according to two different sets of files, the first set of files is identified by file-identifiers of the first size and the second set of files is identified by file-identifiers of a second size that is a different size from the first size; and a processor for
provide access by the OTA transceiver to the stored files, and
providing access by the near-field communications transceiver to the stored files by
running, as a default, a Java-based emulator for accessing the first set of files, the Java-based emulator emulating one of the file-identification protocols, and
otherwise running one or more Java application programming interfaces to access the second set of files.

14. The system of claim 13, wherein the processor provide cryptographic functions using one or more of the Java APIs.

15. The system of claim 13, wherein the Java based emulator is configured to access 28 dedicated files each having 32 elementary files.

16. The system of claim 15, wherein the processor control access to each file using one of a personal identification number, a personal unblocking key and an application key.

17. The system of claim 15, wherein the processor is configured to allow configuration of the DESfire files via the OTA transceiver and wherein the OTA transceiver is a cellular transceiver.

18. The system of claim 15, wherein one or more of the files contain transaction data for a user of the mobile station.

19. The system of claim 13, wherein the terminal reader authenticates a user using data from the files stored in the memory and communicated using near-field communications transceiver.

20. The system of claim 13, wherein the trusted service manager includes a server connected to another OTA transceiver.

* * * * *